Oct. 17, 1950     F. M. ASPIN     2,526,450
LUBRICATION SYSTEM
Filed May 19, 1944     2 Sheets-Sheet 1
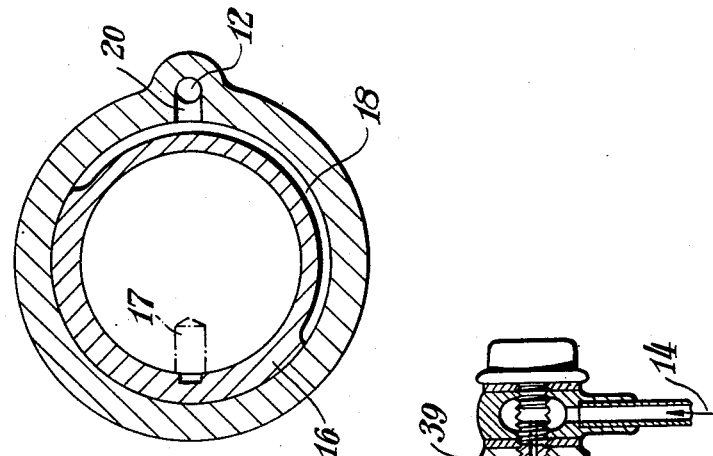
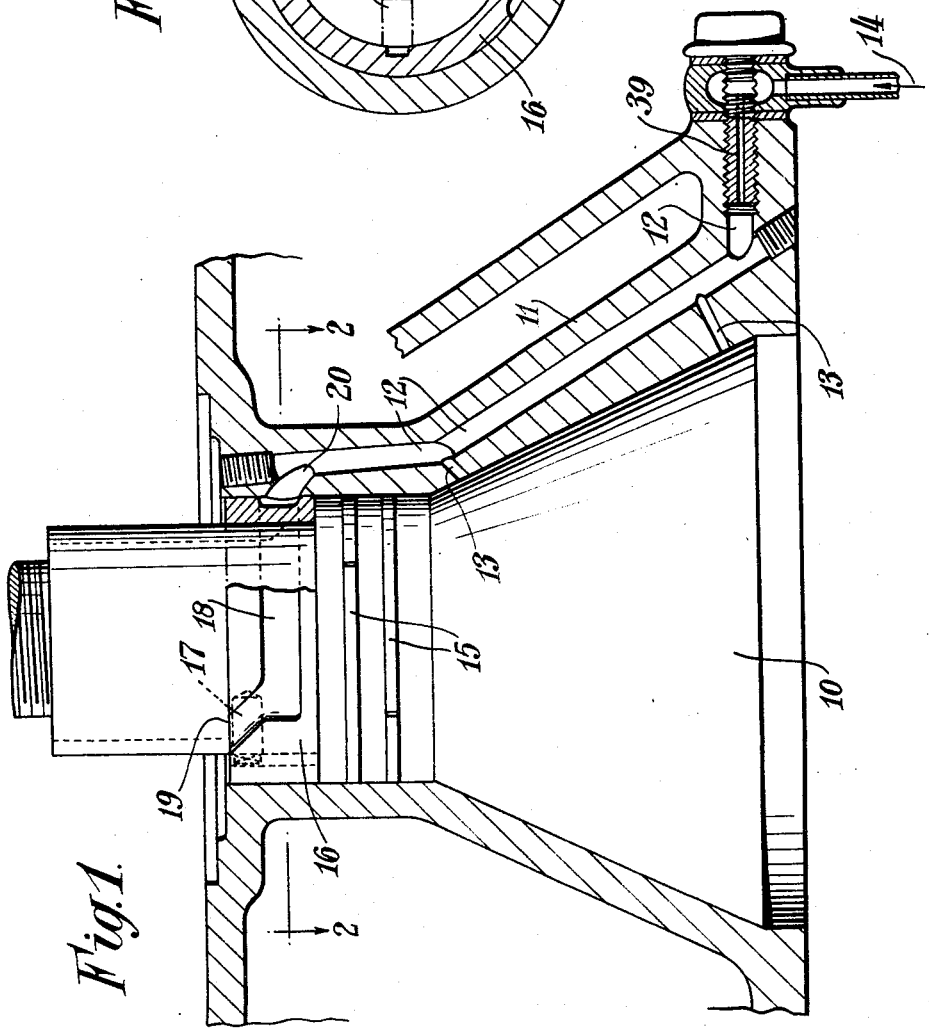
INVENTOR:
Frank M. Aspin.
BY ATTORNEY: Walter Gunow Oct. 17, 1950      F. M. ASPIN      2,526,450
LUBRICATION SYSTEM
Filed May 19, 1944      2 Sheets-Sheet 2
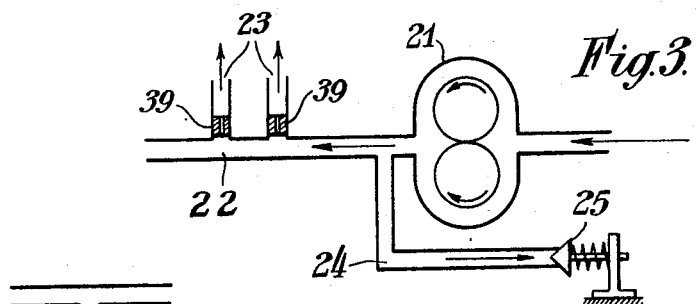
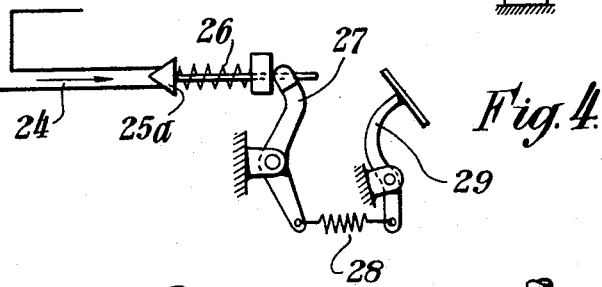
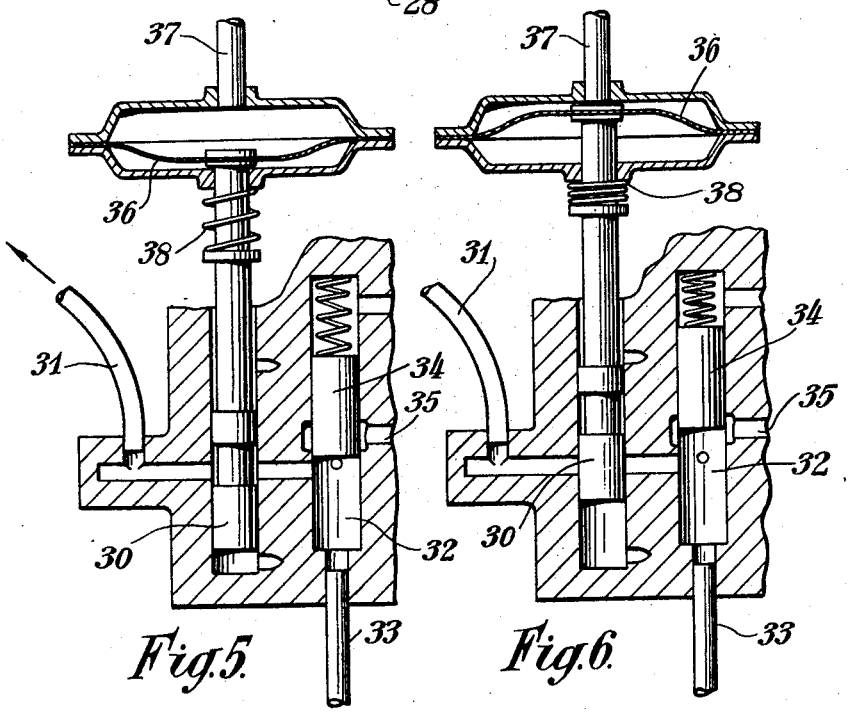
INVENTOR:
Frank M. Aspin.
By Attorney: Walter Guns.

Patented Oct. 17, 1950

2,526,450

UNITED STATES PATENT OFFICE 2,526,450

LUBRICATION SYSTEM

Frank Metcalf Aspin, Bury, England

Application May 19, 1944, Serial No. 536,329
In Great Britain May 12, 1943

Section 1, Public Law 690, August 8, 1946
Patent expires May 12, 1963

9 Claims. (Cl. 184—6)

This invention relates to the lubrication systems of internal combustion engines, compressors and the like and is particularly, but not exclusively, applicable to internal combustion engines, compressors or the like having rotary valves of the kind described in my prior Patents Nos. 2,283,594; 2,245,743; and 2,296,081.

Rotary valves of the kind above referred to are by no means uneconomic or wasteful of lubricant, but at the same time there is room for improvement as regards their lubrication. The bearing loads on the complementary gas-sealing and bearing surfaces of such valves vary very considerably from a peak load, at the peak pressure of combustion, down possibly to a negative load during the "induction" phase. Also, where the valve is that of an internal combustion engine subject to throttle control, there are other controlling factors of variation of load and speed. Obviously an ideal lubrication system would be one in which the lubrication varies with all these changes. It is known to some degree for the general lubrication of an engine, compressor, or the like, to be proportional to engine speed, as the normal lubrication, obtained by pumps driven by the engine, must necessarily produce a pressure which is to some extent proportional to the engine speed; but this relation is usually very limited by providing excess pump delivery and using a pressure-release valve, so that an almost constant pressure obtains in the lubrication system and provides full lubrication for heavy loads at slow speeds. Although not in general use, it has also been proposed in an internal combustion engine to provide control of the pressure-release valve, proportionally with the engine throttle so that the pressure in the lubrication system may increase as some function of the engine load. None of these previously known arrangements, however, has provided for variation of pressure or supply of the system relative to the pressure fluctuations of the engine cycle.

As regards rotary valves and particularly those of the kind described in my earlier patent specifications aforesaid, the bearing load fluctuates very substantially throughout the engine cycle and in order not to invite undue waste of lubricant whilst ensuring ample lubrication during peak load, it is obviously desirable to provide some system of lubrication which has a corresponding cycle or phase so that it is effective during the load phase and relatively reduced but still effective during the exhaust and/or induction phase when the loads are reduced and when lubrication can be reduced to cut down loss at the ports.

The object of the present invention is to provide an improved system of lubrication having such desired characteristics and is based upon the appreciation that such desired result cannot be obtained merely by introducing a rotary cut-off feature into the lubricant supply passage, because at the higher engine speeds the inertia of the lubricant would reduce the flow of lubricant and thus operate to reduce lubrication at the time when due to such increased speed it really needs to be increased.

According to the invention the lubrication system of an internal combustion engine, compressor or like machine is characterised in that pressure release means are provided having a check period synchronised with the cycle of the machine to provide increased lubrication during the load period of the machine.

The invention may also include variation superimposed and related to throttle variation and/or engine speed.

In the accompanying drawings:

Fig. 1 is a sectional elevation of part of a rotary valve for an internal combustion engine embodying one example of lubrication system according to the invention.

Fig. 2 is a sectional plan on line 2—2 of Fig. 1.

Fig. 3 is a diagrammatic illustration of a pump system of an internal combustion engine for use with the invention.

Fig. 4 shows a modification of Fig. 3.

Figs. 5 and 6 are diagrammatic views of a further modification of the invention.

As shown in Figs. 1 and 2 of the drawings, a rotary valve member 10 is mounted in a housing 11. Lubrication for the conical complementary bearing surfaces is provided by an oil duct 12 in the housing with passages 13 therefrom leading to such bearing surfaces. Lubricant is supplied to the duct 12 under pressure in the direction of the arrow 14, as for example from the normal forced-lubrication system of the engine.

The rotary valve member has sealing rings 15 on its stem which serve both as a gas seal and to prevent escape of lubricant from the complementary tapered bearing surfaces. Above the sealing rings and on the stem of the valve member is located a lubrication control ring 16, which is keyed to the rotary valve member by a driving pin 17. This control ring 16 is formed with a groove 18 having an outlet 19 at one side. The groove 18 is adapted to register with an outlet 20 from the duct 12 so that, as the valve member rotates, the outer periphery of the ring alternately and synchronously with the engine cycle closes the outlet 20 or allows lubricant to flow from such outlet 20 through the groove 18 and outlet 19.

In operation, the ring 16 is timed relative to the engine cycle so that its groove unmasks the outlet 20 during that part of the engine cycle when bearing pressures at the tapered valve surfaces are at a minimum. During the compression and explosion cycle of the engine the ring 16 closes the outlet 20 and pressure builds up in the duct 12 so that lubricant is supplied to the feed ducts 13 at increased pressure. As will be seen, when the engine speed is low the groove 18 provides a substantial release of pressure. As the speed of rotation increases the pressure release provided by the groove 18 becomes less effective because the inertia of the lubricant becomes a controlling factor and at high speeds the outlet 20 is closed again by the ring almost before the lubricant has started to flow. Consequently at higher speeds a higher lubrication pressure is maintained.

As shown in Fig. 3 of the drawings the lubrication system of an internal combustion engine comprises a pump 21 supplying a main duct 22 with branch ducts 23 leading for example to the duct 12 of Fig. 1. Pressure control is provided by a branch duct 24 closed by a spring-loaded valve 25. As shown in Fig. 4 the spring 26 of the valve 25a is variably loaded by means of a lever 27 which is connected by an elastic element 28 to the engine throttle pedal 29. The oil delivered by the arrangements of Figs. 3 and 4, may be introduced into duct 12 of Fig. 1.

In operation, the valve 25 limits the maximum pressure in the lubrication system according to the spring loading, which may be adjustable. However, in Fig. 4 the loading of the spring 26 increases with depression of the pedal 29 to open the engine throttle so that the oil pressure is increased for increased engine loads.

As shown in Figs. 5 and 6 a piston valve 30 controls the delivery of lubricating oil to a pipe 31 which may be coupled to the duct 12 of Fig. 1. Lubricant to the valve 30 passes through a chamber 32 supplied from a tube 33 and pressure in the chamber 32 is controlled by a spring loaded valve 34 which is shown in Fig. 5 in a position closing a release passage 35 and in Fig. 6 as having opened such release passage. The piston valve 30 is connected to a diaphragm 36 the upper surface of which is subject to the pressure variations which obtain in the induction manifold of the engine by means of the pipe connection 37. The position of the piston valve 30 is determined by the movement of the diaphragm due to such pressure variations and a spring 38.

In operation, when the engine is idling or on light load the depression or sub-atmospheric pressure in the induction manifold will raise the piston 30 against the pressure of the spring 38. When so raised, the valve 30 completely cuts off the oil supply to the valve via the tube 31, such valve normally obtaining lubrication from the engine cylinder sufficient for such conditions. As soon as the engine load is sufficient to reduce the sub-atmospheric pressure in the induction manifold the valve 30 is moved down by the spring and supplies lubricant to the duct 12 which reaches the bearing surface of the rotary valve member under the conditions above explained with reference to Figs. 1 and 2 whilst maximum oil pressure is controlled by the release valve 34.

As shown in Fig. 1 the oil passage to the duct 12 includes a jet 39 the function of which jet is to limit the flow of oil to the duct 12 so that when the outlet 20 is in register with the groove 18, the pressure release afforded by the outlets 19 of the groove will be substantial. On the other hand, the passage in the jet is of sufficient size to ensure rapid building up of pressure in the duct 12 when the outlet 20 is closed. Thus where as shown in Fig. 3 there may be several ducts 23 each leading to a rotary valve, the momentary release of pressure at such valve by the opening of its outlet 20 will not materially affect the pressure obtaining in the main duct 22 owing to the restrictive actions of the jets 39 which are shown diagrammatically in Fig. 3 immediately adjacent the duct 22.

The invention may be combined in an internal combustion engine with means to vary the supply pressure of lubricant to the duct 12 by any suitable means, such as a release valve loaded proportionally with the throttle opening so that the lubrication pressure at the tapered bearing surfaces will be proportional to engine loads as well as to engine speed whilst, having a cyclic variation synchronous with the cyclic variation of load at the said bearing surfaces.

The invention is obviously not limited to all the details of construction of the example above described, many of which are clearly capable of modification without departing from the nature of the invention.

What I claim is:

1. A lubricating system for internal combustion engines, compressors and the like, comprising a rotary part to be lubricated, a bearing housing for the same, said rotary part being subjected to cyclic variations of pressure by the operation of said engine, a duct in said housing for supplying lubricant under pressure to said rotary part, valve means communicating with said duct for periodically releasing pressure therefrom in synchronism with said cyclic variations, said means being in communication with said duct only at the lower pressure part of said cyclic variations.

2. A lubricating system for internal combustion engines, compressors and the like, comprising a rotary part to be lubricated, a bearing housing for the same, said rotary part being subjected to cyclic variations of pressure by the operation of said engine, a duct in said housing for supplying lubricant under pressure to said rotary part, valve means communicating with said duct for periodically releasing pressure therefrom in synchronism with said cyclic variations, said means being in communication with said duct only at the lower pressure part of said cyclic variations, an additional release valve communicating with said duct and adapted to prevent pressure from exceeding a predetermined limit.

3. A lubricating system for internal combustion engines, compressors and the like, comprising a rotary part to be lubricated, a bearing housing for the same, said rotary part being subjected to cyclic variations of pressure by the operation of said engine, a duct in said housing for supplying lubricant under pressure to said rotary part, valve means communicating with said duct for periodically releasing pressure therefrom in synchronism with said cyclic variations, said means being in communication with said duct only at the lower pressure part of said cyclic variations, an additional release valve communicating with said duct, and means connected to said second valve for varying the amount of release inversely to the fuel being fed to the engine.

4. A lubricating system for internal combustion engines, compressors and the like, comprising a rotary part to be lubricated, a bearing housing for the same, said rotary part being subjected to cyclic variations of pressure by the operation of said engine, a duct in said housing for supplying lubricant under pressure to said rotary part, valve means communicating with said duct for periodically releasing pressure therefrom in synchronism with said cyclic variations, said means being in communication with said duct only at the lower pressure part of said cyclic variations, an additional release valve communicating with said duct, and means connected to said second valve for varying the amount of release so that at light engine loads there is maximum release of pressure, said second valve being operated by variations in manifold vacuum.

5. A lubricating system for internal combustion engines comprising a conical rotary valve, a complementary bearing housing in which said valve seats, a main duct in said housing having a passage for supplyng lubricant to the meeting faces of said valve and housing, a control ring in said housing secured to the small end of said valve, a circumferential groove in said ring adapted to communicate with said duct, an open outlet from said groove, means for supplying lubricant under pressure to said duct, the length and position of said groove being such that during the compression and explosion cycle of said engine said ring closes said duct, whereby lubrication pressure is increased during said cycle.

6. A lubricating system for internal combustion engines comprising a conical rotary valve, a complementary bearing housing in which said valve seats, a main duct in said housing having a passage for supplying lubricant to the meeting faces of said valve and housing, a control ring in said housing secured to the small end of said valve, a circumferential groove in said ring adapted to communicate with said duct, an open outlet from said groove, means for supplying lubricant under pressure to said duct, the length and position of said groove being such that during the compression and explosion cycle of said engine said ring closes said duct, whereby lubrication pressure is increased during said cycle, and a jet in the lubricant supply having an opening of a cross-section substantially less than said duct.

7. A lubricating system for internal combustion engines comprising a conical rotary valve, a complementary bearing housing in which said valve seats, a main duct in said housing having a passage for supplying lubricant to the meeting faces of said valve and housing, a control ring in said housing secured to the small end of said valve, a circumferential groove in said ring adapted to communicate with said duct, an open outlet from said groove, means for supplying lubricant under pressure to said duct, the length and position of said groove being such that during the compression and explosion cycle of said engine said ring closes said duct, whereby lubrication pressure is increased during said cycle, a branch duct communicating with said main duct and having the free end thereof closed by a spring pressed valve.

8. A lubricating system for internal combustion engines comprising a conical rotary valve, a complementary bearing housing in which said valve seats, a main duct in said housing having a passage for supplying lubricant to the meeting faces of said valve and housing, a control ring in said housing secured to the small end of said valve, a circumferential groove in said ring adapted to communicate with said duct, an open outlet from said groove, means for supplying lubricant under pressure to said duct, the length and position of said groove being such that during the compression and explosion cycle of said engine said ring closes said duct, whereby lubrication pressure is increased during said cycle, a branch duct communicating with said main duct and having the free end thereof closed by a spring pressed valve, a pedal connected to the engine throttle, said spring pressed valve being linked to said pedal so that movement of said pedal to open said throttle increases the loading of said valve.

9. A lubricating system for internal combustion engines comprising a conical rotary valve, a complementary bearing housing in which said valve seats, a main duct in said housing having a passage for supplying lubricant to the meeting faces of said valve and housing, a control ring in said housing secured to the small end of said valve, a circumferential groove in said ring adapted to communicate with said duct, an open outlet from said groove, means for supplying lubricant under pressure to said duct, the length and position of said groove being such that during the compression and explosion cycle of said engine said ring closes said duct, whereby lubrication pressure is increased during said cycle, a branch duct communicating with said main duct and having the free end thereof closed by a spring pressed valve, a diaphragm connected to said spring valve and communicating with the intake manifold of said engine, whereby at low manifold pressures said spring valve moves to increase the supply of lubricant to said duct.

FRANK METCALF ASPIN.

REFERENCES CITED

The following references are of record in the file of this patent:

UNITED STATES PATENTS

| Number | Name | Date |
| --- | --- | --- |
| 1,054,808 | Waldon | Mar. 4, 1913 |
| 1,201,038 | Green | Oct. 10, 1916 |
| 1,208,286 | Campbell | Dec. 12, 1916 |
| 1,230,461 | Brush | June 19, 1917 |
| 1,353,894 | Criqui | Sept. 28, 1920 |
| 1,466,445 | Brush | Aug. 28, 1923 |
| 1,582,253 | Elliott | Apr. 27, 1926 |
| 1,834,285 | Loeffler | Dec. 1, 1931 |
| 2,253,327 | Delaval-Crow | Aug. 19, 1941 |
| 2,296,081 | Aspin | Sept. 15, 1942 |
| 2,296,649 | Mueller | Sept. 22, 1942 |
| 2,305,874 | Isley | Dec. 22, 1942 |

FOREIGN PATENTS

| Number | Country | Date |
| --- | --- | --- |
| 451,363 | Great Britain | Aug. 5, 1936 |